US007835616B2

(12) United States Patent
Koshimizu et al.

(10) Patent No.: US 7,835,616 B2
(45) Date of Patent: Nov. 16, 2010

(54) INFORMATION PRESENTATION SYSTEM

(75) Inventors: Minoru Koshimizu, Kanagawa (JP);
Naoki Hayashi, Kanagawa (JP);
Hiroyuki Hotta, Kanagawa (JP);
Shigehiko Sasaki, Kanagawa (JP);
Yoshitsugu Hirose, Kanagawa (JP);
Tsutomu Ishii, Kanagawa (JP);
Masahiro Sato, Kanagawa (JP); Takashi Ozawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1106 days.

(21) Appl. No.: 11/515,866

(22) Filed: Sep. 6, 2006

(65) Prior Publication Data

US 2007/0206922 A1 Sep. 6, 2007

(30) Foreign Application Priority Data

Mar. 6, 2006 (JP) ............................. 2006-060116

(51) Int. Cl.
*H04N 7/00* (2006.01)
(52) U.S. Cl. .......................................... 386/46; 386/95
(58) Field of Classification Search .................. 386/46, 386/95, 92, 124, 125
See application file for complete search history.

(56) References Cited

U.S. PATENT DOCUMENTS

2004/0145660 A1* 7/2004 Kusaka .................... 348/211.2
2004/0249889 A1* 12/2004 Drommond ................. 709/204

FOREIGN PATENT DOCUMENTS

| JP | A 4-44118 | 2/1992 |
| JP | A 5-197444 | 8/1993 |
| JP | A 2002-116845 | 4/2002 |

* cited by examiner

*Primary Examiner*—Robert Chevalier
(74) *Attorney, Agent, or Firm*—Oliff & Berridge PLC (57) ABSTRACT

An information presentation system for supporting interactions based on presentation of various pieces of information in a scene where persons face each other, the information presentation system includes: a plurality of display record media, each having a unique identifier, where display information can be rewritten; an information selection section that selects information to be displayed on the display record medium; an information rewrite section that is detachably attached to the display record medium, and that rewritably writes the information selected by the information selection section to the display record medium in a state where the display record medium is attached to the information rewrite section; a history storage section that records a history of the information in association with the unique identifier of the display record medium; and a manipulation detection section that detects a selective manipulation of a user on the display record medium.

11 Claims, 5 Drawing Sheets

INFORMATION PRESENTATION SYSTEM

BACKGROUND

1. Technical Field

This invention relates to an information presentation system to support interactions based on presentation of various pieces of information in a scene where persons face each other and in particular to an information presentation system of which the user makes the most for an interview and a business talk as face-to-face communications.

2. Related Art

Hitherto, a large number of units each having two screens wherein while one screen can be presented to a customer, information can be displayed and keyboard entry can be made on the other screen have been proposed as a display of which the user makes the most for an interview and a business talk as face-to-face communications of a small number of persons. Every unit is implemented with an eye to viewing documents and is designed for displaying one document on two screens or producing enlarged display on one screen to reconcile portability and display performance.

SUMMARY

According to an aspect of the invention, there is provided an information presentation system for supporting interactions based on presentation of various pieces of information in a scene where persons face each other, the information presentation system comprising:

a plurality of display record media, each having a unique identifier, where display information can be rewritten;

an information selection section that selects information to be displayed on the display record medium;

an information rewrite section that is detachably attached to the display record medium, and that rewritably writes the information selected by the information selection section to the display record medium in a state where the display record medium is attached to the information rewrite section;

a history storage section that records a history of the information written to the display record medium by the information rewrite section in association with the unique identifier of the display record medium; and a manipulation detection section that detects a selective manipulation of a user on the display record medium displaying the information.

BRIEF DESCRIPTION OF THE DRAWINGS

Exemplary embodiments of the present invention will be described in detail based on the following figures, wherein.

DETAILED DESCRIPTION

The invention functions as follows:

The information presentation system according to the invention is used to support interactions of an interview, a business talk, etc., based on presentation of various pieces of information in the scene where concerned parties of a client, a user, etc., face each other. An outline of the functions is as follows: The information used for interaction is previously stored in a database constructed in external or internal memory of the system, for example, and the information to be written to a display record medium is selected by the information selection section from among the stored information pieces.

A plurality of display record media are provided so that the user can compare and examine the information on the display record media placed side by side. Each display record medium has a unique identifier and thus can be identified. For example, a medium which allows display information to be rewritten and can be used repeatedly, such as an optical write type display record medium or a display record medium driven electrically by a pixel electrode, can be adopted as the display record medium. The information refers mainly to document information, but is not limited to text and also includes various pieces of data of pattern, symbol, table, image, video, audio, etc.

The information selected by the information selection section can be written by the information rewrite section as rewritable information with a display record medium put on the information rewrite section. The information written to the display record medium is recorded in the history storage section in association with the unique identifier of the display record medium together with the history of the information. The records concerning the histories, etc., can be used for various applications; for example, it is also made possible to utilize the records for analysis of person's likes, etc., for making the records useful for the next business talk, etc.

Particularly in the system, the manipulation detection section can detect the selective manipulation of the user on the display record medium displaying the information. The selective manipulation of the user involves the action of the user intentionally selecting and picking up one from among the display record media displaying the information, selective additional write manipulation of the user to the display record medium displaying the information, manipulation on the input operation device provided on the display record medium, addition of a handwritten image, etc., for example. If the manipulations and the manipulation descriptions are also recorded in the history storage section, the information can be utilized as more useful and advantageous information concerning the user.

According to the information presentation system according to the invention, various pieces of information are presented in an easy-to-view and easy-to-handle manner for a person, such as the person, receiving information in interactions based on presentation of various pieces of information in a scene where persons face each other, thereby enabling the person to easily compare and examine the information, a history of all information presented off the cuff in response to the person's demand in the scene is recorded, and the information finally determined useful in the presented information is recorded through manipulation on the display record medium, whereby the records can be stored in a reusable manner without additional record work and can be utilized for various applications as useful records attendant on the information.

Referring now to the accompanying drawings, there are shown preferred embodiments of the invention.

Figure 1:
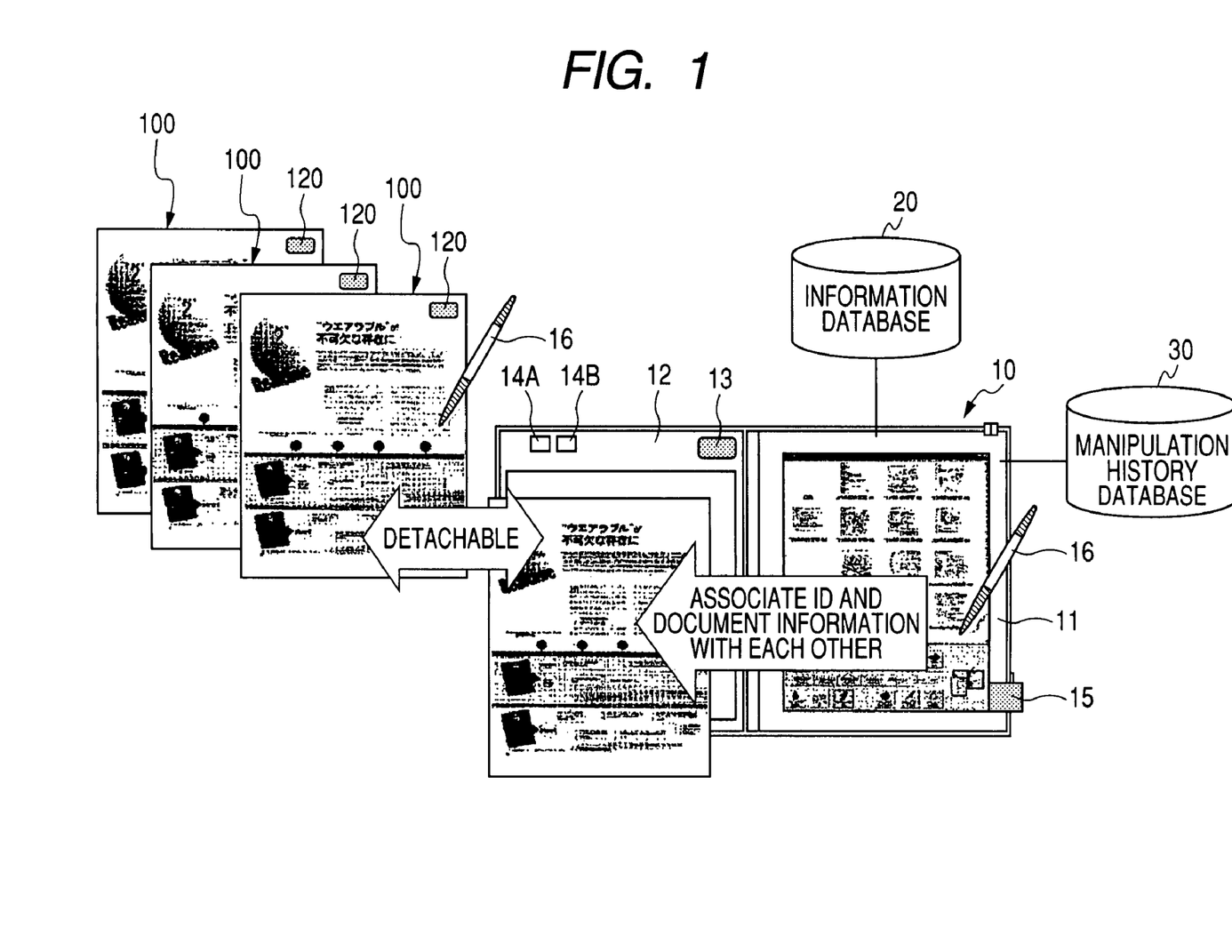
FIG. 1 is a configuration drawing to schematically show the whole of an information presentation system according to a first exemplary embodiment of the invention.

FIGS. 1 to 5 show a first exemplary embodiment of the invention. FIG. 1 is a conceptual system configuration drawing of the first exemplary embodiment of the invention. An information presentation system according to the exemplary embodiment is intended as a system of which the user makes the most for an interview and a business talk as face-to-face communications among a small number of persons. The system is not only a system made up of a plurality of computers, hardware, units, etc., connected by a network, etc., but also a system implemented as one computer. As the former system example, a system made up of a thin client and a server can be named wherein a terminal section operated by the user is simplified only as an interface function having input and display functions and the actual program is executed in an information processing apparatus connected to the network and only a screen image and a user-entered command are transferred in two ways between the terminal section and the information processing apparatus. To adopt such a system configuration, no information is left in the terminal section, whereby the security can be enhanced and the terminal section can be made lightweight and can consume low power; particularly, the system is appropriate for use with the operation section brought to an environment outside the security like a business talk. The information includes text information, graphics information, image information, video information, audio information, a combination thereof, etc., and more particularly document information used with business and the like.

A module refers to a generally and logically detachable part of software, hardware, etc. Therefore, the module in the exemplary embodiment means not only a module in a program, but also a module in the hardware configuration. Therefore, the exemplary embodiment described below also server as the description of an apparatus, a method, and a program. Modules are almost in a one-to-one correspondence with functions; however, in implementation, one module may be one program or two or more modules may make up one program or two or more programs may make up one module. Two or more modules may be executed by one apparatus or one module may be executed in two or more apparatus in a distributed or parallel environment. In the description to follow, the term "connection" contains not only physical connection (wired, wireless), but also logical connection.

As shown in FIG. 1, the information presentation system is made up of display record media where display information can be rewritten, a display record medium terminal 10 for handling the display record media, an information database 20 and a manipulation history database 30 of external storage that can transfer information to and from the display record medium terminal 10 via a wireless or wire communication line, and the like. The information presentation system also includes a digital pen 16 as a handwrite input module for erasably adding a handwritten image onto a display area of the display record medium. The digital pen 16 can acquire the coordinates of the pen point by electric, electromagnetic, or optical read section and transmits acquired information to the display record medium terminal 10. The display information contains document information centering on text information assumed for use in business, graphics information, image information, and moving image information and audio information, etc., depending on the situation. The specific configuration will be discussed below:

The display record medium may be any if display information can be rewritten. For example, preferably a paper-like flexible and thin medium called electronic paper or digital paper where an image can be rewritten, capable of holding display of an image in a no-power supply state is used. As a specific example of such electronic paper, optical write type electronic paper 100 can be used.

Figure 2:
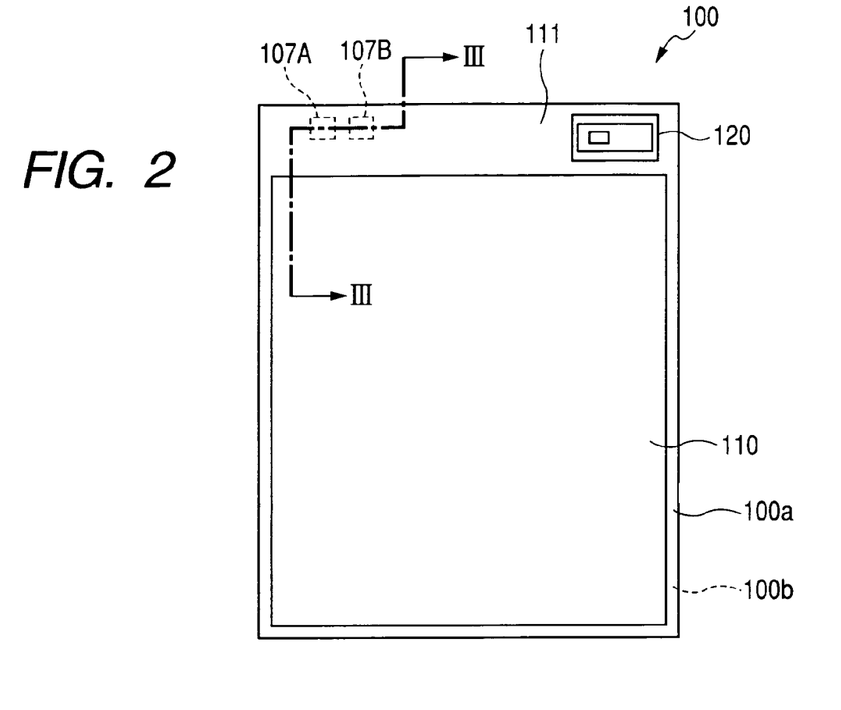
FIG. 2 is a plan view to show optical write type electronic paper of a display record medium of the information presentation system according to the first exemplary embodiment of the invention.

FIG. 2 is a plan view of the optical write type electronic paper 100. The optical write type electronic paper 100 has a thin rectangular shape and is provided with an image display record area 110 on a surface 100a, an RFID tag 120 made up of an IC tip as a unique identifier (ID) and an antenna, embedded in a peripheral area 111, and a pair of power receiving terminals 107A and 107B on a back 100b.

An identifiable identifier may be formed using a contact or non-contact IC card or IC label rather than the RFID tag 120. In addition, as identifiable ID, optically readable ID such as a bar code or a two-dimensional bar code may be formed or an identifiable identifier using an ID module capable of magnetic read may be formed.

Figure 3:
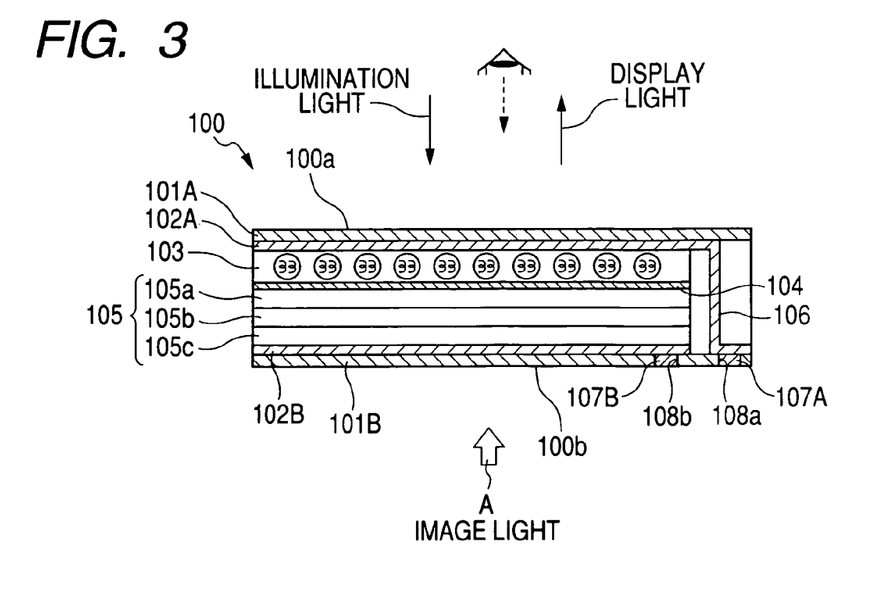
FIG. 3 is a sectional view taken on line III-III in FIG. 2.

FIG. 3 is a sectional view taken on line III-III in FIG. 2. The optical write type electronic paper 100 is made up of a pair of substrates 101A and 101B of transparent PET (polyethylene terephthalate) placed facing each other, a pair of transparent electrodes 102A and 102B made of ITO (indium tin oxide) provided inside the substrates 101A and 101B, a liquid crystal layer 103 provided inside the transparent electrode 102A on the side of the surface 100a and made of crystal liquid having a memory property with reflectivity (transmittance) changing in response to applied voltage, for example, cholesteric liquid crystal, a light absorption layer 104 provided inside the liquid crystal layer 103, a photoconductive layer 105 provided between the light absorption layer 104 and the transparent electrode 102B on the side of the back 100b, the photoconductive layer 105 with the resistance value lessening as image light A is applied, and an extension part 106 connected at one end to the transparent electrode 102A. In the exemplary embodiment, the display layer is a single layer, but display layers having different reflection colors can also be deposited between the transparent electrode and the substrate described above. In this case, each display layer may be placed between a transparent electrode and a substrate or the display layers may be directly deposited on each other and may be sandwiched between a transparent electrode and a substrate.

The cholesteric liquid crystal can be encapsulated into microcapsules and dispersed in a resin binder; spherical liquid crystal drops can be directly dispersed in a resin binder; or the liquid crystal can be filled into a structure put into cells of a given size by resin partitions. In so doing, the mechanical strength is enhanced while the flowability of the display layer is limited, so that the display image is hard to change with an external pressure or a stress of flexing, etc.

The substrate 101B on the side of the back 101b is provided with a pair of openings 108a and 108b and the power receiving terminal 107A is provided on the extension part 106 of one opening 108a and the power receiving terminal 107B is provided on the transparent electrode 102B of the other opening 108b.

The photoconductive layer 105 is made up of two charge generation layers 105a and 105c and a charge transport layer 105b provided therebetween. The charge generation layers 105a and 105c are deposited on both sides of the charge transport layer 105b, so that it is made possible to apply AC voltage to the liquid crystal layer 103, degradation of the liquid crystal layer 103 can be suppressed, and low drive voltage and long life of the optical write type electronic paper 100 can be realized.

It is advisable to adopt a double-spread binder-like terminal configuration for the display record medium terminal 10 as shown in FIG. 1. In FIG. 1, the right display section 11 has a screen with a touch panel for selecting information. An LCD, an EL display, etc., used as a usual PC monitor, etc., can be used as the screen. The display section 11 functions as an information selection module for selecting information to be displayed on the optical write type electronic paper 100 out of the information database 20 described later together with a predetermined program for controlling the operation of the display section 11.

An information menu arranging the title names of information stored in the information database 20, icons indicating the information, etc., is displayed on the screen of the display section 11, enabling the user to select any desired information out of the information menu. The screen of the display section 11 corresponds to a display module for displaying the information menu. To select an entry out of the information menu, the user can touch an icon on the screen or use the digital pen 16, etc. In addition, cursor keys may be provided for enabling the user to select an entry. The digital pen 16, etc., corresponds to a selection module for enabling the user to select any desired information out of the information menu.

A write section 12 on the left in FIG. 1 in the display record medium terminal 10 is joined to the display section 11 in one piece so that it can be opened and closed, and the optical write type electronic paper 100 can be attached to and detached from the write section 12. The write section 12 has an exposure face on which the optical write type electronic paper 100 is to be put. If the user selects the information to be written onto the optical write type electronic paper 100 according to the display section 11 and gives a predetermined write command with the optical write type electronic paper 100 put on the exposure face, the information is converted into print image data.

In the write section 12, a bias voltage is applied to the optical write type electronic paper 100 while pattern light of the print image is applied to the optical write type electronic paper 100 and consequently the print image of the information is instantaneously written onto the optical write type electronic paper 100. Thus, the write section 12 functions as an information rewrite module for rewritably writing the information selected by the information selection module onto the optical write type electronic paper 100 together with a predetermined program for controlling the operation of the write section 12.

Figure 4:
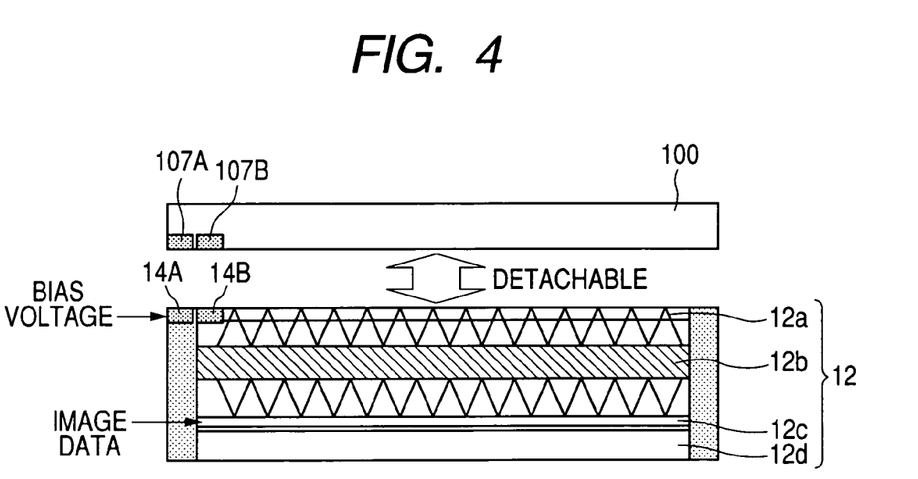
FIG. 4 is a configuration drawing to schematically show a write section corresponding to an information rewrite module in a display record medium terminal of the information presentation system according to the first exemplary embodiment of the invention.

A configuration centering on a thin light exposure system is adopted for the write section 12 as shown in FIG. 4, whereby the write section 12 (the display record medium terminal 10) is suited for the use of the exemplary embodiment because the display record medium terminal 10 (the write section 12) is provided with excellent portability and can be used as it is placed flat on a desk at the face-to-to communication time. The write section 12 is made up of a transparent support section 12a forming an exposure face, a two-dimensional microlens array 12b, a liquid crystal panel 12c, and a backlight 12d deposited on each other in order from the top layer to the bottom layer. The exposure face of the write section 12 forms a light exposure module of an image.

The write section 12 applies a two-dimensional light pattern from the liquid crystal panel 12c through the two-dimensional microlens array 12b onto the photoconductive layer 105 of the optical write type electronic paper 100 (see FIG. 3) put on the transparent support section 12a so as to form an image on the photoconductive layer 105, causes a resistance distribution based on the light pattern to occur on the photoconductive layer 105, applies a voltage between the transparent electrodes 102A and 102B, applies a partial pressure distribution based on the resistance distribution of the photoconductive layer 105 to the display layer, and writes the image responsive to the partial pressure distribution to the display layer.

The write section 12 is provided on the upper end side with a reader 13 for reading an RFID tag 120 at a position at which the RFID tag 120 overlaps the reader 13 when the optical write type electronic paper 100 is put on the write section 12. Further, the write section 12 is provided on the upper end side with a pair of feeding terminals 14A and 14B at a position at which the pair of power receiving terminals 107A and 107B overlaps the pair of feeding terminals 14A and 14B when the optical write type electronic paper 100 is put on the write section 12. The pair of feeding terminals 14A and 14B makes up a voltage application module.

As shown in FIG. 1, the information database 20 and the manipulation history database 30 of external storage that can transfer information to and from the display record medium terminal 10 via a wireless or wire communication line are connected to the display record medium terminal 10. Alternatively, the display record medium terminal 10 may be provided with internal local memory 15 implemented as all or parts of the information database 20 and the manipulation history database 30. The information database 20 stores various pieces of information to be displayed on the optical write type electronic paper 100 and allows information to be added, rewritten, and erased, needless to say.

When the information to be displayed on the optical write type electronic paper 100 through the display section 11 is selected out of the information database 20 or to write information to the optical write type electronic paper 100 by the write section 12, the ID (unique identifier) of the optical write type electronic paper 100 and the information to be written are retained in the manipulation history database 30 in association with each other. Thus, the manipulation history database 30 functions as a history storage module for recording the history of the information written to the optical write type electronic paper 100 by the write section 12 in association with the ID of the optical write type electronic paper 100 together with a predetermined program for controlling recording in the manipulation history database 30.

Not only the history of the information written to the optical write type electronic paper 100 and the ID of the optical write type electronic paper 100, but also the descriptions and the history of selective manipulations of the user on the optical write type electronic paper 100 displaying information are recorded in the manipulation history database 30. The selective manipulations of the user on the optical write type electronic paper 100 displaying information and a manipulation detection module for detecting manipulation are as follows:

In addition to a module for detecting the write manipulation history of writing selected information to the optical write type electronic paper 100 in the predetermined program for controlling the operation of the write section 12 (print software, etc.,), for example, a module for reading the ID of the optical write type electronic paper 100 to which additional write manipulation is applied through the reader 13 provided in the write section 12 when the user performs additional write manipulation of handwriting onto the optical write type electronic paper 100 on which information is written an displayed, referencing the manipulation history database 30 previously recording the correspondence between the ID and written information, and determining the additional write manipulation to the information or the like can be named specifically.

Further, a module for detecting manipulation of selecting optical write type electronic paper 100 to which information utilized in face-to-face communications is written from among sheets of optical write type electronic paper 100 to which various pieces of information are written, reading the selected optical write type electronic paper 100 through the reader 13, and selecting particularly important information or the like can also be named specifically.

Next, the operation of the information presentation system according to the exemplary embodiment is as follows:

In FIG. 1, the information presentation system reads various pieces of information to be utilized at the time of an interview or a business talk as face-to-face communications from the information database 20 stored in the local memory 15 installed in the display record medium terminal 10 or the information database 20 in the external storage connected to the display record medium terminal 10 via a wire or wireless communication line and displays an information menu on the screen of the display section 11 on the right of the display record medium terminal 10. The user can select any actually used information out of the information menu.

The information selected on the display section 11 is transmitted to the write section that can be opened and closed relative to the display section 11 on the left of the display section 11, and is rewritably written to the optical write type electronic paper 100 by the write section 12 based on predetermined operation (command) of the user. More particularly, as shown in FIG. 4, the write section 12 applies a two-dimensional light pattern from the liquid crystal panel 12c through the two-dimensional microlens array 12b onto the photoconductive layer 105 of the optical write type electronic paper 100 (see FIG. 3) put on the transparent support section 12a so as to form an image on the photoconductive layer 105. The write section 12 causes a resistance distribution based on the light pattern to occur on the photoconductive layer 105, applies a voltage between the transparent electrodes 102A and 102B, applies a partial pressure distribution based on the resistance distribution of the photoconductive layer 105 to the display layer, and can write the image responsive to the partial pressure distribution to the display layer.

According to the write section 12, while a voltage is applied to the whole of the top and bottom transparent electrodes 102A and 102B, image information is exposed to light like a plane, whereby the image information can be printed (written) and thus it is made possible to write large-capacity image information at high speed as compared with line exposure, scanning exposure, etc. As a module for generating an image-like light pattern, for example, a selfluminous display such as an EL display may be used in addition to the configuration using the liquid crystal panel 12c and the backlight 12d in combination shown in FIG. 4. Not only the method of forming an image of the image-like light pattern through the two-dimensional microlens array 12b, but also a method of projecting emitted light from a light emission panel displaying an image directly onto the optical write type electronic paper 100 for exposure to light or the like can also be used as a thin light exposure system.

Further, the write operation of information (image) on the optical write type electronic paper 100 will be discussed. In FIG. 3, when a pulse voltage is applied between the pair of the transparent electrodes 102A and 102B through the pair of power receiving terminals 107A and 107B and image light A is applied to the back 100b, the image light A is applied through the substrate 101B and the transparent electrode 102B to the photoconductive layer 105. As the image light A is applied to the photoconductive layer 105, the resistance value of the photoconductive layer 105 lessens and accordingly the partial pressure of the liquid crystal layer 103 determined by the impedance ratio to the photoconductive layer 105 increases and a voltage exceeding a given or more threshold value is applied and then the liquid crystal layer 103 is held in a state in which the light reflectivity in the liquid crystal layer 103 is large.

Therefore, when the optical write type electronic paper 100 is viewed from the surface 100a, the area to which the image light A is applied is seen white if illumination light is received and is reflected on the liquid crystal layer 103 and the wavelength of the reflected light distributes widely in the visible range. In contrast, in the area to which the image light A is not applied, the resistance value of the photoconductive layer 105 grows and a voltage not exceeding the threshold value is applied to the liquid crystal layer 103 and then the liquid crystal layer 103 is held in a light transmission state. The light passing through the liquid crystal layer 103 is absorbed in the light absorption layer 104 and thus the area to which the image light A is not applied is seen black.

Further, since the cholesteric liquid crystal has a characteristic of interference reflecting of color light responsive to helical pitches, the liquid crystal layer 103 made of the cholesteric liquid crystal is formed by depositing liquid crystal materials different in helical pitch, so that it is also possible to realize color display as a simple structure.

The once recorded image is maintained with no power supply, but an erasion voltage is applied to the power receiving terminals 107A and 107B as required, whereby the displayed image information can also be easily erased and a new image can be repeatedly written and erased for reusing the optical write type electronic paper 100 again and again. Since the optical write type electronic paper 100 is opposite in the applying direction of the image light A and the viewing direction of the image, the user can immediately check the reflected image easy on the eyes, formed on the surface 100a of the optical write type electronic paper 100 without being dazzled by unnecessary write light at the image writing time.

Thus, the optical write type electronic paper 100 to which an information image is written can be easily detached from the write section 12 of the display record medium terminal 10, so that the user can remove the optical write type electronic paper 100 from the write section 12 and can pass the optical write type electronic paper 100 to a person facing the user and can write information across pages requiring a comparison to two or more sheets of optical write type electronic paper 100 and can view the information with the sheets of optical write type electronic paper 100 placed side by side.

When early selected information is written to the optical write type electronic paper 100, the ID of the optical write type electronic paper 100 and the written information can be retained in the manipulation history database 30 in association with each other before or after. The history information associating the ID of the optical write type electronic paper 100 and the written information with each other may be retained not only in the manipulation history database 30 of the external storage connected in a wired or wireless manner, but also in the local memory 15 installed in the display record medium terminal 10.

Here, the recording operation of retaining the history information in the manipulation history database 30 can be set by a predetermined program specifically, for example, so that it is performed when the information is written or when the optical write type electronic paper 100 is detached from the write section 12 after the information is written. The point in time when the optical write type electronic paper 100 is detached from the write section 12 can be easily detected, for example, as the pair of power receiving terminals 107A and 107B comes in contact, noncontact with the pair of feeding terminals 14A and 14B.

Figure 5:
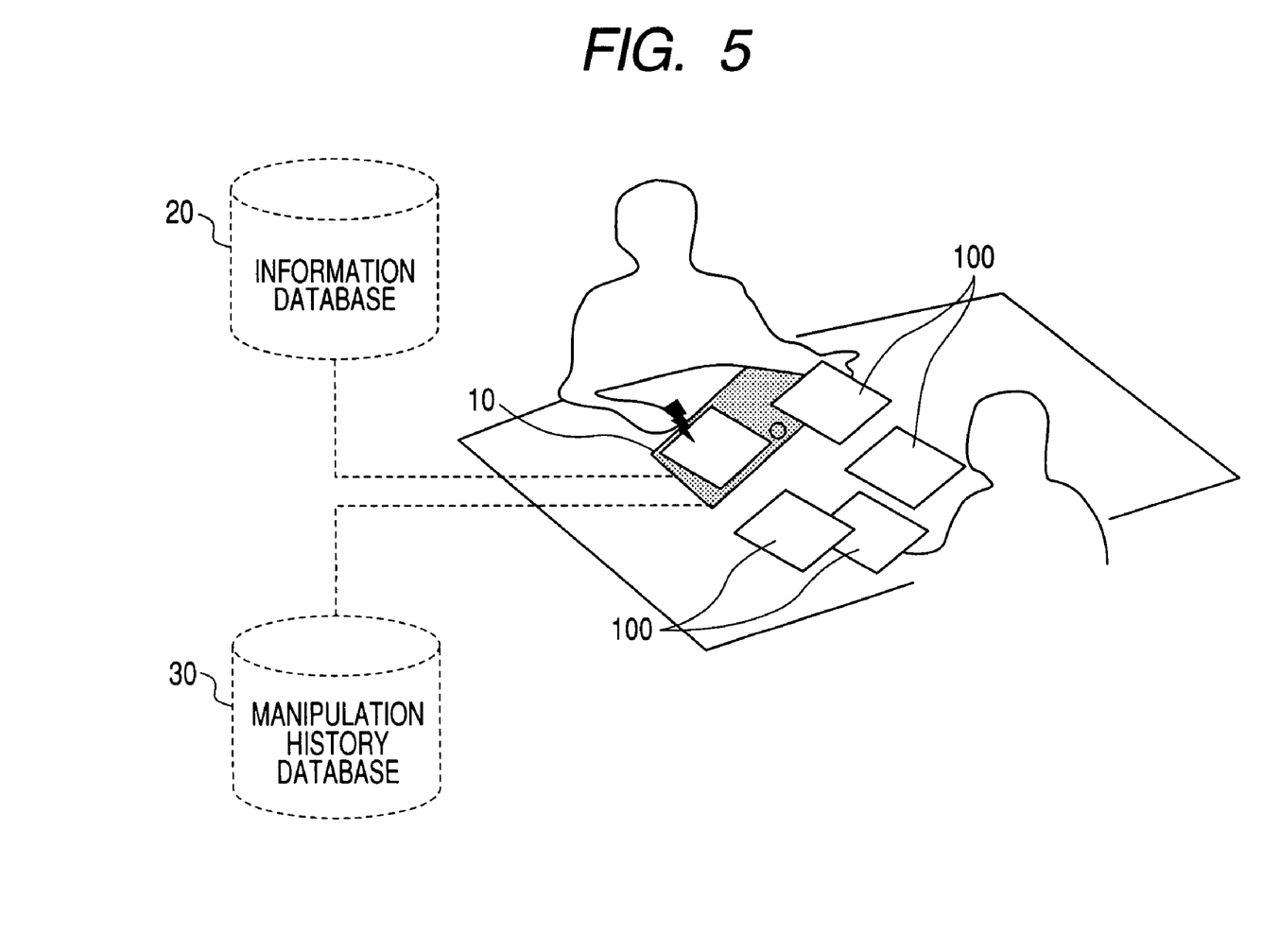
FIG. 5 is a schematic representation to show a face-to-face communication scene using the information presentation system according to the first exemplary embodiment of the invention.

In FIG. 5, a digital pen 16 which has ink (white board pen, etc.,) capable of displaying and erasing handwriting on a smooth plane such as a plastic film (equivalent to the substrate 101A) at a pen point and further can digitize handwriting can be used to add a comment or a memo relevant to the displayed information to the optical write type electronic paper 100 to which the information is written. Thus, it is made possible to provide an information medium having a high affinity for the user (client) for enabling the user to easily and smoothly process information in such a manner to write a comment, a correction, a modification, etc., to information displayed on the optical write type electronic paper 100 and write future action items, etc., at the face-to-face communication time.

Not only the history of the information written to the optical write type electronic paper 100 and the ID of the optical write type electronic paper 100, but also the descriptions and the history of selective manipulations of the user on the optical write type electronic paper 100 displaying information are recorded in the manipulation history database 30. That is, the information to which handwriting is added as described above can also be determined more utilized information at the face-to-face communication time and thus may be detected by a manipulation detection module of an electronic sensor, a CCD (charge-coupled device) sensor, any other pressure sensitive sensor, an ultrasonic sensor, etc., for sensing handwriting of the digital pen 16, for example, and then additional write history information may also be stored and managed in association with the additional write information.

Specifically, when the user performs additional write manipulation of handwriting to the optical write type electronic paper 100, the ID of the optical write type electronic paper 100 to which the handwriting is added is read through the reader 13 installed in the write section 12 and the manipulation history database 30 previously recording the correspondence between the ID and written information is referenced. If the manipulation is determined the additional write manipulation to the information, the additional write history information may be recorded in the manipulation history database 30 together with the additional write description detected by the various sensors mentioned above. At this time, if the correspondence between the ID of the optical write type electronic paper 100 and written information is once stored in memory of the digital pen 16 and is transferred later when the display record medium terminal 10 is connected to the manipulation history database 30 in a wired manner, data recording is simplified; however, if the data is recorded whenever necessary with the display record medium terminal 10 wirelessly connected to the manipulation history database 30, it is made possible to transmit information in real time.

A data conversion module for converting a handwritten image added to the display area of the optical write type electronic paper 100 with the digital pen 16 with the optical write type electronic paper 100 put on the write section 12 into digital data, for example, may be installed on the write section 12 of the display record medium terminal 10. The digital data provided by the data conversion module can also be recorded in association with the history of the information written to the optical write type electronic paper 100 and the ID of the optical write type electronic paper 100.

The specific module of additional write manipulation is not limited to the digital pen 16; for example, if a battery and memory are installed in the optical write type electronic paper 100 and an input operation device for enabling marking manipulation, etc., on a part of information, for example, is provided on the optical write type electronic paper 100, information output from the input operation device is detected, whereby history information of the manipulation with the input operation device may be stored and managed together in association with the description of the manipulation with the input operation device.

Alternatively, only the action of the user selecting one from among sheets of optical write type electronic paper 100 displaying the information, namely, for example, picking up and putting it on the write section 12 may be grasped as selective manipulation of the user on the optical write type electronic paper 100. In this case, a contact detection sensor of a passive RF element circuit for receiving an external electromagnetic wave as supply of power in a non-contact manner and returning a response signal to a transmitted signal and an input operation device are installed in one piece on the optical write type electronic paper 100 as section for detecting the action of the user picking up the optical write type electronic paper 100 or the like. As an alternative method, the single reader 13 for selectively reading the ID of the optical write type electronic paper 100 serves as manipulation detection module.

Further, as another manipulation history, the IDs of sheets of optical write type electronic paper 100 may be electrically read in a non-contact manner in such a manner that the user selects particularly important information only from among pieces of information once displayed on the optical write type electronic paper 100 and puts the sheets of electronic paper containing the selected information on the write section 12 in a bundle state or brings them close to the reader 13 installed in the write section 12. Thus, the sheets of optical write type electronic paper 100 displaying actually utilized information in the face-to-face communication scene can be grasped as a new unit and this unit can also be recorded and utilized as information concerning selective manipulation of the user.

Various manipulations, manipulation descriptions, and manipulation histories as described above are also stored in the manipulation history database 30 in association with the history of the information written to the optical write type electronic paper 100 and the ID of the optical write type electronic paper 100 described above, whereby the records can be used for various uses and can also be utilized for the use of simplifying the labor and time for instantly calling information at a later interview time particularly to smooth face-to-face communications.

Figure 6:
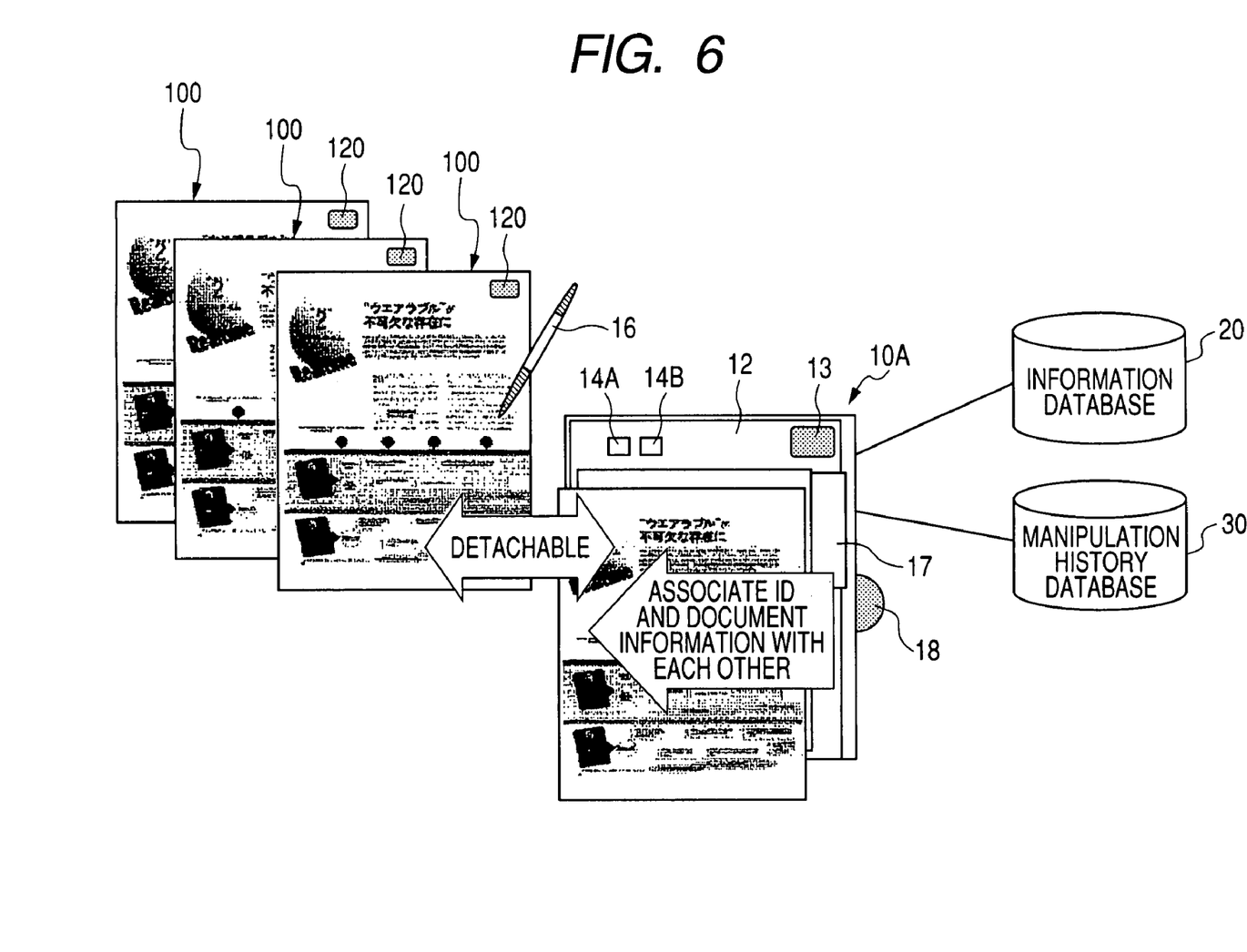
FIG. 6 is a configuration drawing to schematically show the whole of an information presentation system according to a second exemplary embodiment of the invention.

FIG. 6 shows a second exemplary embodiment of the invention.

In the exemplary embodiment, a display record medium terminal 10A forming the basis of an information presentation system is provided by simplifying and miniaturizing the configuration of the display section 11 of the display record medium terminal 10 described above and installing the display section 11 substantially at one end of a write section 12 as an attachment.

In the exemplary embodiment, an information selection module for the user to select the information to be displayed on optical write type electronic paper 100 is made up of a menu screen 17 provided at one end of the write section 12 and a selection UI device 18 for the user to select any desired information out of an information menu displayed on the menu screen 17.

According to the configuration of the information presentation system according to the second exemplary embodiment, the display record medium terminal 10A is more simplified and miniaturized and it is also possible to reduce the manufacturing cost of the whole information presentation system. Parts similar to those of the first exemplary embodiment are denoted by the same reference numerals in FIG. 6 and will not be discussed again.

In the exemplary embodiments described above, for example, the information selection module for the user to select information displayed on the optical write type electronic paper 100 may be set so as to enable the user to search for information recorded in the past in association with the optical write type electronic paper 100 based on the ID thereof.

In the exemplary embodiment described above, the ID (unique identifier) is given to the optical write type electronic paper 100. However, for example, the ID may also be given to the user and the user ID and the information or the history information and the manipulation information may be stored in the information database 20 and the manipulation history database 30 in association with each other. In this case, a user ID acquisition section is additionally provided in a proper part of the display record medium terminal 10, 10A.

The user ID specifically can be entered by the user using a keyboard, etc., or can be acquired using a magnetic card, an IC card, etc., different from the optical write type electronic paper 100. Alternatively, a mobile telephone can also be operated for displaying authentication information on the screen of the display section 11 and acquiring the display information. If the user ID is authenticated in the display record medium terminal 10 and authentication is granted, the user ID and the information stored in the information database 20 and the manipulation history database 30 may be displayed on the screen of the display section 11 in association with each other.

As the display record media that can be adopted in the exemplary embodiments, not only the optical write type electronic paper 100 described above, but also a display record medium electrically driven by a pixel electrode can be adopted. In this case, the information rewrite module is formed of a module for controlling energization of the electrode. Specifically, for example, a toner display system of encapsulating charged color particles that can be flied in the presence of an electric field in gas, an electrophoretic display system of scattering charged particles in an insulting liquid, or a display technology of a configuration for applying a voltage and driving cholesteric liquid crystal material, etc., by a matrix electrode or a discrete pixel electrode can also be used.

Further, if a display record medium of the type wherein pixels are selectively written electrically as described above is used, the exemplary embodiment is characterized by the fact that the display record medium is provided with only drive electrodes or a part of a drive circuit and a power supply section and a signal supply section of the main components of image rewrite module are made detachable. According to the configuration, it is made possible to display a plurality of pieces of information at the same time on a plurality of display record media to enhance the listing property of information and enable the user to easily compare and examine the descriptions.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An information presentation system for supporting interactions based on presentation of various pieces of information in a scene where persons face each other, the information presentation system comprising:

a plurality of display record media, each having a unique identifier, where display information can be rewritten;

an information selection section that selects information to be displayed on the display record medium;

an information rewrite section that is detachably attached to the display record medium, and that rewritably writes the information selected by the information selection section to the display record medium in a state where the display record medium is attached to the information rewrite section;

a history storage section that records a history of the information written to the display record medium by the information rewrite section in association with the unique identifier of the display record medium; and a manipulation detection section that detects a selective manipulation of a user on the display record medium displaying the information.

2. The information presentation system according to claim 1, wherein the manipulation detection section comprises a section that selectively reads an identifier of a display record medium selected by a user from among the plurality of display record media displaying information.

3. The information presentation system according to claim 1, wherein the manipulation detection section comprises a section that detects at least one of: a selective additional write manipulation of a user to the display record medium displaying the information; and a manipulation on an input operation device provided on the display record medium.

4. The information presentation system according to claim 1, wherein the history storage section records information based on a detection result of the selective manipulation of the user on the display record medium detected by the manipulation detection section in association with the unique identifier of the display record medium.

5. The information presentation system according to claim 1, which further comprises a handwrite input section that erasably adds a handwritten image onto a display area of the display record medium, wherein the manipulation detection section comprises a section that detects at least additional write with the handwrite input section.

6. The information presentation system according to claim 5, which further comprises a data conversion section that converts the handwritten image added onto the display area of the display record medium with the handwrite input section into digital data, wherein the history storage section also records the digital data provided by the data conversion section in association with the history of the information written to the display record medium and the unique identifier of the display record medium.

7. The information presentation system according to claims 1,
   wherein the information selection section comprises: a display section that displays an information menu; and a selection section for a user to select any entry out of the information menu.

8. The information presentation system according to claim 2,
   wherein the section that selectively reads an identifier of the display record medium selected by a user from among the plurality of display record media displaying information reads electrically, electromagnetically or optically identifiers of the plurality of display record media in a non-contact manner.

9. The information presentation system according to claim 1,
   wherein the history storage section can be set so as to conduct an operation of a recording when the display record medium is detached from the information rewrite section.

10. The information presentation system according to claim 1,
    wherein the display record medium is an optical write type display record medium, and
    wherein the information rewrite section comprises: a section that exposes an image to light; and a voltage application section.

11. The information presentation system according to claim 1,
    wherein the display record medium is a display record medium electrically driven by a pixel electrode, and
    wherein the information rewrite section comprises a section that controls energization of the pixel electrode.

* * * * *